United States Patent [19]
Chen et al.

[11] Patent Number: 5,412,660
[45] Date of Patent: May 2, 1995

[54] ISDN-TO-ISDN COMMUNICATION VIA SATELLITE MICROWAVE RADIO FREQUENCY COMMUNICATIONS LINK

[75] Inventors: David T. Chen, Los Gatos; Ronald A. Everoski, Los Altos; William C. Lam, Milpitas, all of Calif.

[73] Assignee: Trimble Navigation Limited, Sunnyvale, Calif.

[21] Appl. No.: 119,596

[22] Filed: Sep. 10, 1993

[51] Int. Cl.$^6$ ............................................. H04B 7/185
[52] U.S. Cl. .................................. 370/110.1; 370/99; 370/97; 455/12.1
[58] Field of Search ...................... 370/110.1, 94.1, 97, 370/99, 104.1, 85.13; 375/8; 455/12.1, 13.1, 13.2, 98

[56] References Cited

U.S. PATENT DOCUMENTS 5,172,375 12/1992 Kou ................................ 370/104.1

OTHER PUBLICATIONS

James S. Lee, "Symbiosis Between a Terrestrial-Based Integrated Services Digital Network and a Digital Satellite Network," IEEE Journal on Selected Areas in Communication, Jan. 1983.

Primary Examiner—Douglas W. Olms
Assistant Examiner—Huy D. Vu
Attorney, Agent, or Firm—Thomas E. Schatzel

[57] ABSTRACT

An embodiment of the present invention includes a plurality of portable satellite terminals (PSTs) and a network control unit (NCU) in mutual communication by a communications satellite. Integrated services digital network (ISDN) basic rate interfaces (BRI) are provided at each PST and NCU such that commercially available equipment may be connected and link access procedure D-channel (LAPD) protocols are supported end-to-end. CCITT Recommendation V.42 link access procedure-modem (LAPM) with the selective frame reject option is used to carry whole LAPD frames within the information fields of LAPM frames over the satellite link. Protocol conversion units are employed at each PST and NCU to convert LAPD to LAPM and back again.

14 Claims, 4 Drawing Sheets

ISDN-TO-ISDN COMMUNICATION VIA SATELLITE MICROWAVE RADIO FREQUENCY COMMUNICATIONS LINK

BACKGROUND OF THE INVENTION

1. Field of the Invention

The present invention relates generally to voice and data communications systems and more specifically to such systems incorporating the integrated digital services network and earth-satellite-earth communications.

2. Description of the Prior Art

A telephone communications service, known as integrated service digital network (ISDN), is a communication network in which various services such as voice, data and facsimile (FAX) share the same transmission and switching facilities. A customer (subscriber) is presented with a common interface for all services and a unified set of control procedures are used to access the network. Common equipment is used to transmit and switch signals of all tile service varieties in and among network exchanges.

ISDN has mainly been considered as a terrestrial-based system. However, James S. Lee, in "Symbiosis Between a Terrestrial-Based Integrated Services Digital Network and a Digital Satellite Network," *TUTORIAL: Integrated Services Digital Network (ISDN)*, by William Stallings, IEEE Computer Society, New York: 1983, pp. 302-308, suggests that digital satellite networks, such as the Satellite Business Systems (SBS) network and the French TELECOM I network, may be symbiotically combined with ISDN. Lee observes that satellite power and bandwidth are at a premium, therefore the efficient use of both is essential. The satellite motion in orbit results in a Doppler effect and the clock derived has some inherent frequency uncertainty that must be removed before it can be interfaced with a terrestrial digital network. The typicallone-way propagation of a satellite signal is one hundred and twenty milliseconds, which is relatively long, compared to terrestrial network delays.

Using existing satellite networks or creating proprietary networks causes interface and compatibility problems for users, especially small users who lack the resources necessary for the implementation of such networks. Thus for such users, there is a need for a system that can reliably carry ISDN channels over satellite communications links and present standard ISDN interfaces in the field to which ordinary and conventional equipment may be connected.

SUMMARY OF THE PRESENT INVENTION

It is therefore an object of the present invention to provide a communication system that extends an ISDN-to-ISDN link via a communications satellite which is transparent to users.

It is a further object of the present invention to provide a communication system that allows users to employ industry-standard ISDN equipment and software in building custom communications networks.

Briefly, a preferred embodiment of the present invention includes a plurality of portable satellite terminals (PSTs) and a network control unit (NCU) in mutual communication over a communications satellite. Integrated services digital network (ISDN) basic rate interfaces (BRI) are provided at each PST and NCU such that commercially available equipment may be connected and link access procedure D-channel (LAPD) protocols are supported end-to-end. CCITT Recommendation V.42 link access procedure-modem (LAPM) with the selective frame reject option is used to carry whole LAPD frames within the information fields of LAPM frames over the satellite link. Protocol conversion units are employed at each PST and NCU to convert LAPD to LAPM and back again.

An advantage of the present invention is that it provides a system in which ISDN may be extended over a communications satellite link and thereby to all locations serviceable by such satellite communication.

Another advantage of the present invention is that it provides a system in which readily available commercial communications hardware and software may be interfaced to the system.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
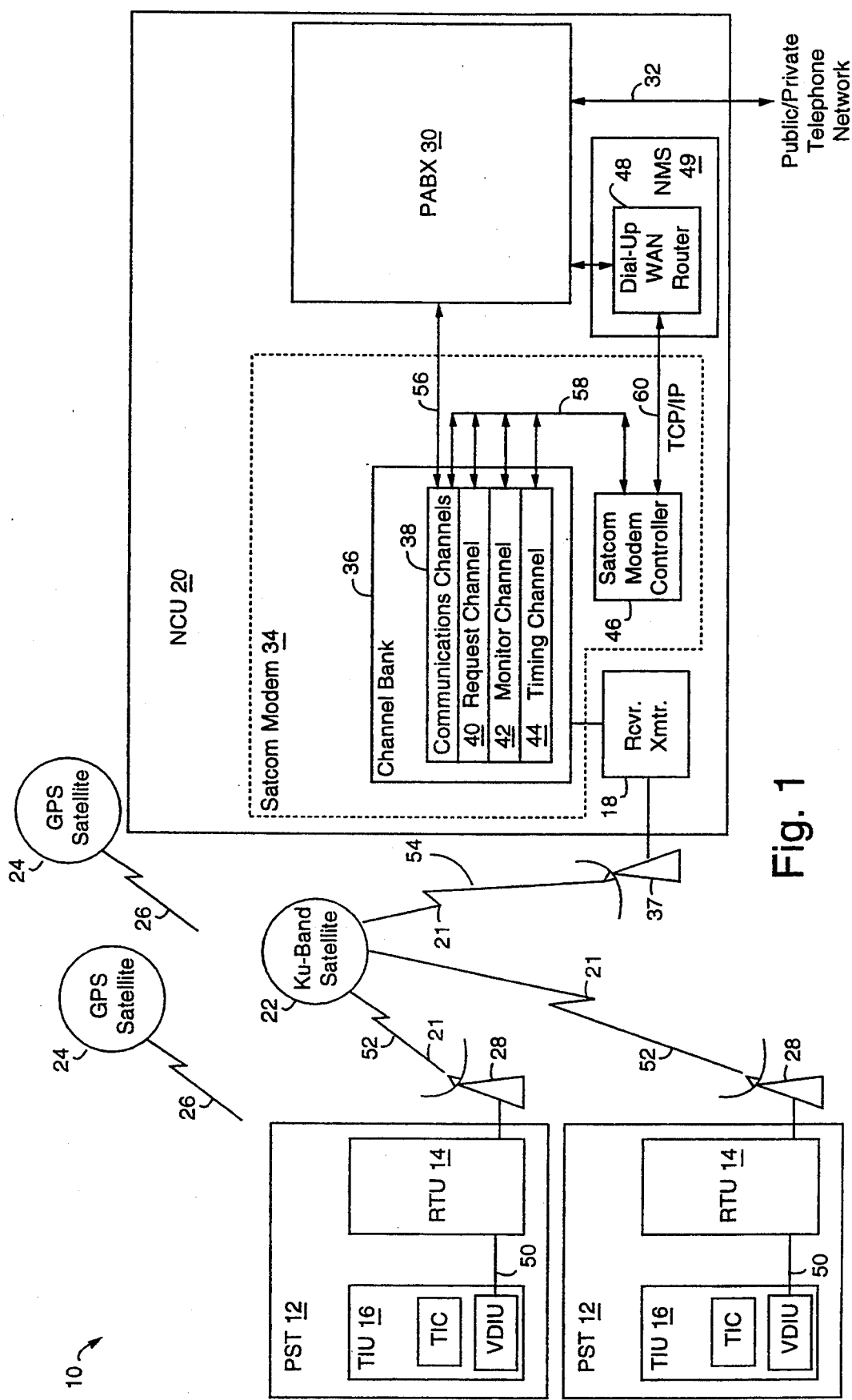
FIG. 1 is a block diagram of a satellite based communications system embodiment of the present invention.

FIG. 1 illustrates a communication system embodiment of the present invention, referred to by the general reference numeral 10. System 10 comprises a portable satellite terminal (PST) 12 including a receiver-transmitter unit (RTU) 14 and a terminal interface unit (TIU) 16, a hub terminal receiver-transmitter unit 18 and a network control unit (NCU) 20. Communication is supported by direct spread spectrum (DSS) continuous phase modulation (CPM) via a plurality of radio links 21 with a Ku-band communications satellite 22. A plurality of GPS satellites 24 provide a plurality of GPS signals 26 that permit automatic attitude positioning of a 0.5 meter antenna 28 such that antenna 28 points to satellite 22. Greater detail concerning the automatic pointing of antenna 28 is contained in co-pending U.S. patent application Ser. No. 07/835,187, filed Feb. 13, 1992, and which is incorporated by reference herein. Typical radio link 21 transmit frequencies include 14.0-14.5 GHz and receive frequencies include 11.7-12.2 GHz. Transmission media at most other satellite frequencies are possible, e.g., receive frequencies 10.95-11.2 GHz and 11.45-12.7 GHz, and in such bands alternate bands as C-band or X-band use 4/6 GHz and ⅞ GHz, respectively. A private branch exchange (PABX) 30 provides multi-line access to a public/private telephone network interface 32 for system 10.

Figure 3:
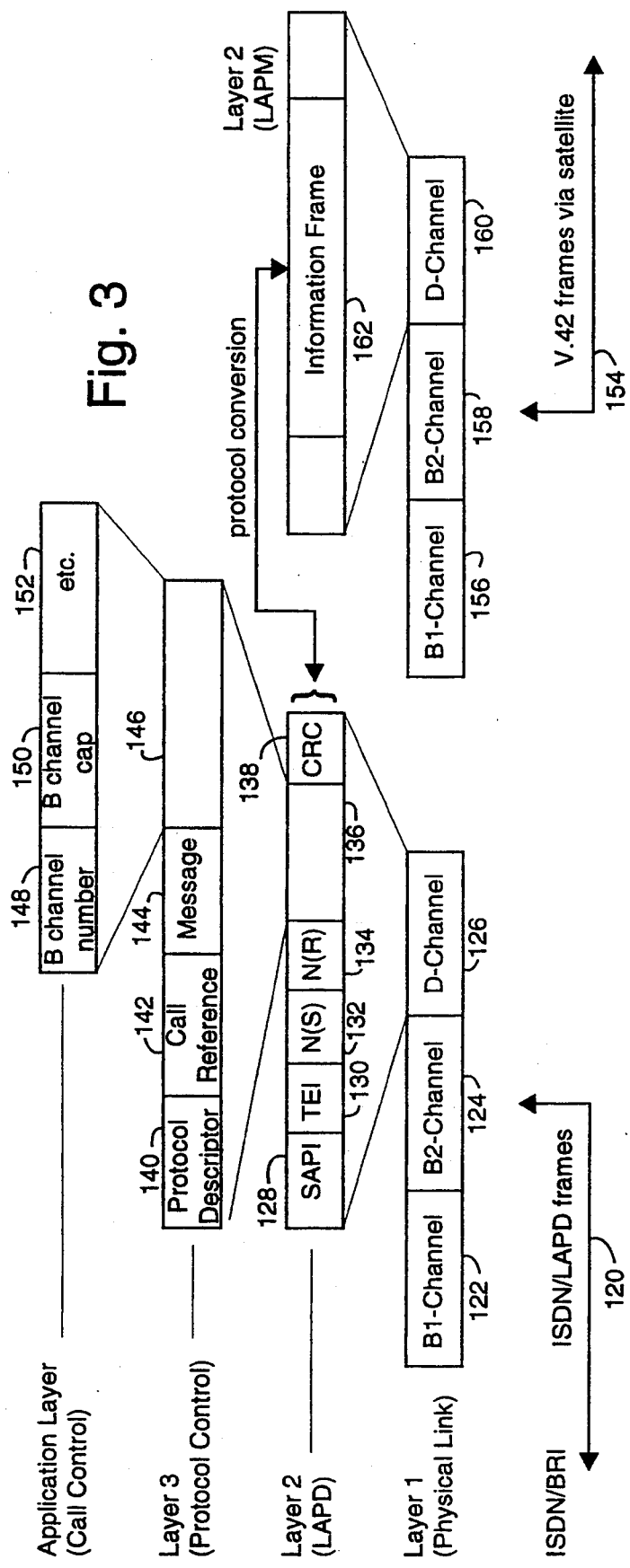
FIG. 3 is a layered communications model diagram representing the action of packing and unpacking a LAPD frame in a LAPM that occurs in the protocol conversion machine of FIG. 2.

Interfacing to system 10 by the public/private telephone network to PABX 30 and by users to PSTs 12 preferably conforms to the Integrated Service Digital Network (ISDN) standards promulgated by the International Telegraph and Telephone Consultive Committee (CCITT) in Geneva, Switzerland. Conforming to the ISDN standard maximizes the range of communications equipment that can be interfaced to by system 10 and simplifies the building of networks because conventional equipment and software can be used in the construction. Standard ISDN communication ports comprise two bearer channels ("B1" and "B2") and one digital signaling channel ("D"), in the case of a basic rate interface (BRI), and twenty-three channels ("B1" through "B23") and one digital signaling channel ("D") in the case of a primary rate interface (PRI). A BRI case is illustrated in FIG. 3 for the physical layer in a layered model. The conventional bit rate for "B" channels (ISDN/B) is 64K bps, and 16K bps for "D" channels (ISDN/D). In system 10 these rates may be compressed to reduce the bandwidth necessary over satellite 22.

NCU 20 comprises a satcom modem 34 which comprises at least one channel bank 36. An antenna 37 provides communication between satellite 22 and NCU 20. Each channel bank 36 includes a plurality of communications channels 38, a request channel 40, a monitor channel 42 and a timing channel 44. A satcom modem controller 46 is connected to the channel bank 36 and a dial-up wide area network (WAN) router 48 within a network management server (NMS) 49. End-to-end network access interfacing provides end-to-end voice and data connectivity between PST 12 users and any non-PST users via communications channels 38 and satellite 22. System 10 functionality includes call setup/teardown, call routing, calling and called information conveyance for calls originated and terminated to or from an external network access, e.g., via PABX 30.

System 10 supports the CCITT ISDN specification type I.430 BRI at the NCU 20 end. The ISDN/B channel is the basic user channel which can be used to carry digital data or PCM-encoded digital voice. Other kinds of connections can also be setup over a ISDN/B channel, such as packet-switched or leased line configurations. The standard BRI channel structure consists of two full duplex ISDN/B channels (64K bps) and a full duplex ISDN/D channel (16K bps). FIG. 3 and the description related to FIG. 3 provide further detail on the standard BRI channel structure. The combined simple bit rate is 144K bps, but framing, synchronization, and other overhead bits may drive the total bit rate on a basic access link up to 192K bps.

CCITT specification I.430 is the ISDN basic user-network interface layer one definition for the physical layer in a layered model. The number of wires, voltage levels, maximum cable lengths, waveforms, jitter, tolerance values, et cetera, are all specified. A basic user-network interface comprises two bearer "B" channels (ISDN/B) and one "D" channel (ISDN/D), or a single "D" channel. The various modes of operation, customer-premise arrangements, and functional characteristics, such as bit timing, octet timing, frame alignment, access control, power feeding and activation and deactivating procedures, are also defined. At interface 32 the equivalent line may be a PRI (twenty-three ISDN/B channels and a command ISDN/D channel for all of the ISDN/B channels), a partial PRI (less than twenty-three ISDN/B channels and a command ISDN/D channel), and/or analog lines "E&M" two-wire or four-wire trunks, and/or analog trunks or fractional T1 trunks. For more information regarding BRI and PRI interfaces, see, "5ESS Switch National ISDN/BRI Specification 5E8 Software Release," AT&T 235-900-341, Issue One, December 1991.

The ISDN/D channel carries various kinds of control information, including information about who is calling whom and signaling information to control circuit-switched calls on ISDN/B channels at the user interface. The ISDN specification allows for the use of the ISDN/D channel for packet-switching or lower-speed telemetry at times when no signaling information is waiting. System 10 preferably uses ISDN/D channels internal to system 10 for internal telemetry, such as the transmission of performance data, alarms etc.

There are five types of data communication links internal to system 10: a TIU-RTU data link 50, a PST-to-NCU satellite data link 52 and a NCU-to-PST satellite data link 54, a satcom modem-PABX data link 56, a satcom modem communication highway 58 and a network management system (NMS 49)-NCU data link 60. Data link 50 is an ISDN S/T link between the RTU 14 and TIU 16. It carries a full 2B+"D" ISDN/BRI interface signal. TIU 16 is equivalent to a "TA" and RTU 14 is equivalent to a "NT" in ISDN parlance. Apart from the regular call setup protocols, the ISDN/D channel carries extra messages to manage the network of system 10, as necessary.

A transparent connection of two ISDN/B channels and one ISDN/D channel is preferably transmitted via satellite 22, such that interface 32 is substantially reproduced at interface 50. Some messages are added and dropped in the ISDN/D channel to administrate system 10 and to relieve a user at each end of such administrative details. For a voice communication via an ISDN/B channel, a voice compression algorithm may preferably be used to enable efficient satellite transfer, even though the bit stream and reproduced sound may be degraded as a result. In most cases the degradation to human voice will not seriously affect intelligibility.

For an ISDN/PRI interface 32, the ISDN/B channels are imported unchanged into PABX 30. The associated ISDN/D channel contains information about each caller and a call-initiator, as well as type of call information. For each call, one of the ISDN/B channels and some of the associated "D" messages are passed on by PABX 30 to satcom modem 34 via data link 56.

TIU 16 provides both a voice and a data external interface. The voice interface provides four-wire handset signaling via the ISDN/D channel. The data interface provides a RS-232 serial interface and supports 2400, 4800, 9600 and 19,200 bits-per-second (bps) asynchronous communication, CCITT specification V.24, and signaling via ISDN/D channel. Conventionally, protocol layering above the physical layer is meaningful for ISDN/B channels only when they are carrying user data. When the ISDN/B channel forms part of an end-to-end, circuit-switched connection through an ISDN, all of the protocol layers above layer one are user-defined and hence not subject to standardization within the user-network interface. When an ISDN/B channel provides access to a packet data service within the ISDN, layers two and three of X.25 are used and high layer protocols are user defined.

Signaling protocols within the ISDN/D channel are sub-divided into two protocol layers, layers two and three respectively. The ID channel layer two protocol is called LAPD (Link Access Procedure D) and is defined by CCITT Recommendations Q.920 (I.440) and Q.921 (I.441), which cover general and detailed aspects respectively.

The ISDN/D channel layer three signaling protocol is defined by Recommendations Q.930 (I.450) and Q.931 (I.451), which includes general and detailed aspects respectively. The link layer protocol for the ID channel, LAPD, has been derived from the CCITT Recommendation X.25 LAPB link layer protocol, which itself is a subset of the high level data link control (HDLC) protocol standard developed by the International Standards Organization (ISO). LAPD has been designed primarily to satisfy the signaling requirements of ISDN basic access. In particular, it allows multiple terminal devices to use a shared ID channel to communicate reliably with multiple higher layer entities in the network (e.g., Q.931 call handling procedures, X.25 packet handling procedures and others).

Figure 2:
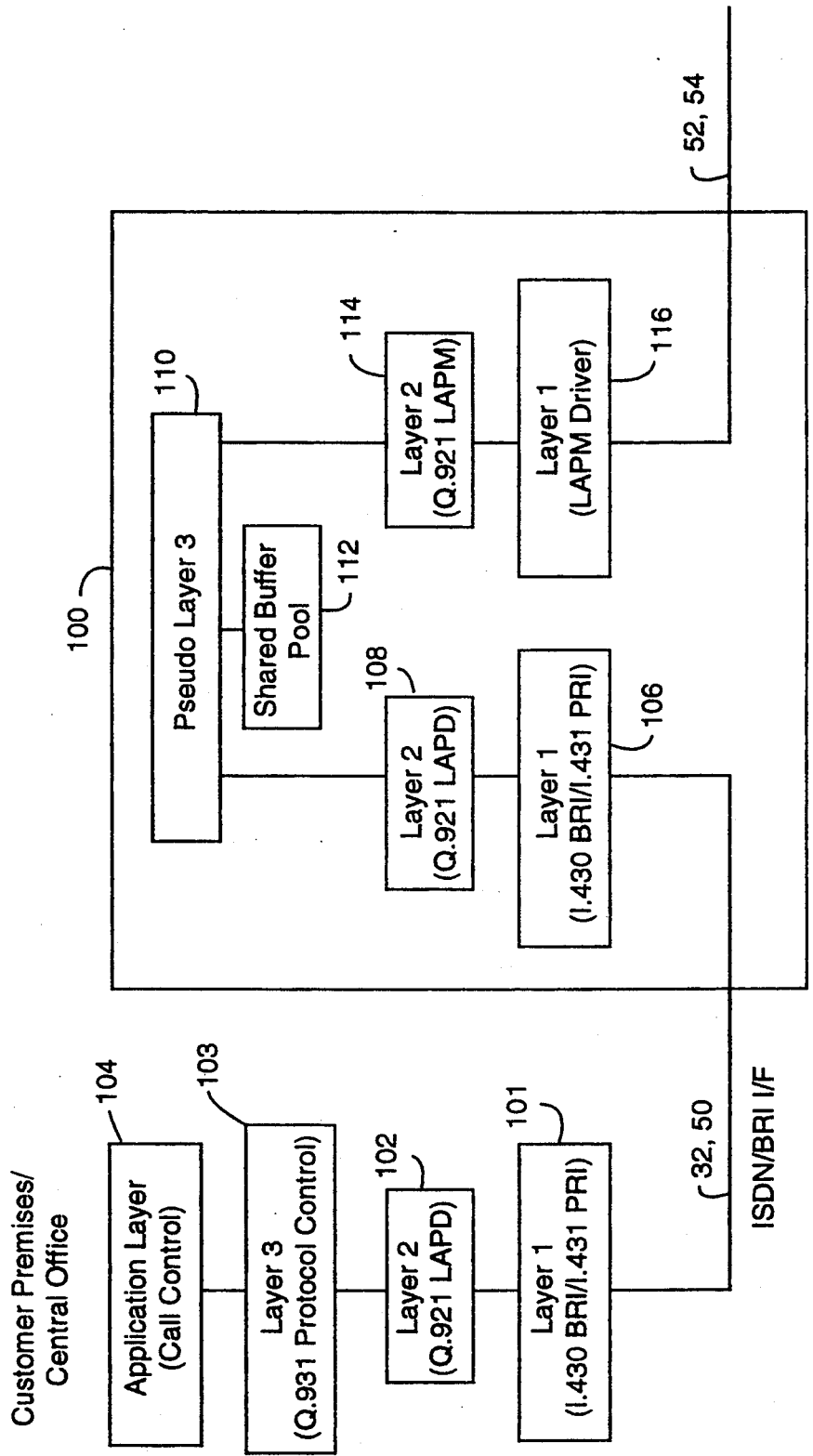
FIG. 2 is a block diagram of a protocol conversion machine included in the system of FIG. 1 at each end of a ISDN-ISDN link.

FIG. 2 illustrates a protocol conversion machine (PCM) 100 and representations of the protocol layers and specifications for ISDN/D channel signaling, as typically used in the conventional Digital Subscriber Signaling System One (DSSS1). PCM 100 is preferably implemented as a computer program within PSTs 12 and NCU 20.

Externally to system 10, a first layer 101, the physical layer, multiplexes and demultiplexes, for example, the signals of two ISDN/B channels and an ISDN/D channel over a single wire pair or physical communications link, e.g., data links 32 and 50. The ISDN/D channel connects to upper layers of the DSSS1 protocol stack, whereas each ISDN/B channel connects to the appropriate bearer device, e.g., telephone codec, LAPB processor, et cetera. The protocol used for the first layer 101 is based on CCITT Recommendation I.430 (BRI) or I.431 (PRI).

A second layer 102, the data link layer, detects and corrects transmission errors introduced during signal transmission over the access connection of the first layer 101. The second layer 102 guarantees to higher layers of protocol that all signaling packets generated by the higher layers will be successfully transmitted, in sequence and without errors across an access connection. Each data packet transmitted has attached to it a sequence number and an error check code (ECC). When such a packet is received, the ECC is used to determine if the message has lost its integrity. Sequence numbers are used to determine if entire packets were lost. If any errors or drop-outs are detected, the data link layer communicates with its peer at the other end of the current access connection to request a re-transmission of messages until an error-free, in-sequence transmission of messages has been achieved.

At a third layer 103, the protocol control layer, and higher layers, the protocol stack becomes ISDN specific. The third layer 103 keeps track of the states through which a call passes during call setup and teardown. Typical states include offhook and waiting for a dial tone equivalent, playing dial tone, first digit dialed and waiting for dial tone to stop, another digit dialed, and so on. Several calls may occur simultaneously on B1, B2, etc., with each call at a different point in its progress. The third layer 103 must keep track of each state of each call separately. CCITT Recommendation Q.931 defines the protocol for the third layer 103.

A call control/application layer 104 has overall responsibility for operating a particular application (voice/data phone, terminal adapter, FAX machine or other terminal equipment) that is attached to an ISDN interface. The application layer is appraised of how many ISDN/B channels exist and the call progress states of each, and it is responsible for connecting ISDN/B channels through when a call is established. The call control/application layer 104 services the various input/output (I/O) devices on the terminal equipment, such as hookswitch, any display, a UART, et cetera.

The LAPD protocol used for the second layer 102 becomes constrained when the physical layer includes a satellite, such as satellite 22. Satellites introduce noise and delays not normally associated with landlines. Usually, conventional ISDN communications equipment will expect to follow CCITT Recommendation Q.921, LAPD. Unfortunately, LAPD experiences some difficulties when it must be carried over satellite 22, such as between PSTs 12 and NCU 20. System 10 therefore converts LAPD which enters at its external interfaces within NCU 20 and PSTs 12 to another HDLC based public-sector protocol known as Link Access Procedure-Modem (LAPM), which may then be successfully communicated through satellite 22. The LAPM is then reconverted to LAPD for the far side ISDN interface.

PCM 100 (FIG. 2) converts between LAPD at interfaces 32 and 50 and LAPM at data links 52 and 54. One PCM 100 is needed at each end. A physical link layer 106 provides for CCITT I.430 BRI interfacing and/or I.431 PRI interfacing of LAPD connection 32 and 50 to a LAPD data link layer 108. A pseudo layer three 110 uses a shared buffer pool 112 to match the data flow rates on each side of PCM 100 and to pack and unpack LAPD data packets into and out of the information frames of LAPM blocks. LAPM blocks are communicated through a LAPM data link layer 114 and a LAPM driver 116 via data links 52 and 54 and satellite 22. Error-free protocol re-transmission via satellite 22 is preferably in accordance with LAPM selective reject and re-transmission methods rather than LAPD methods which can cause lengthy re-transmissions. LAPM driver 116 preferably comprises digital compression such that the 16K bps signaling rate of the ISDN/D channel may be reduced to 2.4K bps over satellite 22 to economize on bandwidth requirements.

FIG. 3 illustrates the protocol conversion between LAPD and LAPM with a data flow diagram that diagrams the action within PCM 100. An external ISDN/BRI connection 120 carries a pair of ISDN/B channels 122 and 124 and an ISDN/D channel 126. The simplified frame of ISDN/D represented by channel 126 comprises a service access point identifier (SAPI) 128, a terminal end point identifier (TEI) 130, a send sequence frame number (N(S)) 132, a receive sequence frame number (N(R)) 134, an information field 136 and a cyclic redundancy check (CRC) 138. The LAPD address field is comprised of SAPI 128 and TEI 130 and constitute a data link connection identifier (DLCI). Protocol control is encoded in field 136 and includes a protocol descriptor 140, a call reference 142, a message 144 and an application field 146. Within field 146 are carried a B-channel number 148, a B-channel cap 150 and a miscellaneous field 152. V.42 frames (LAPM) are communicated over a satellite link 154 and carry a physical link layer comprising a pair of ISDN/B channels 156 and 158 and a special D-channel frame 160. The frame 160 has an information field 162 within which is packed or unpacked a complete LAPD ISDN/D channel frame 126. This preserves all the call control and protocol control fields within field 136 for end-to-end LAPD procedures. The ISDN/B channels 122 and 124 are simply exchanged with ISDN/B channels 156 and 158 without modification. The DCLI of ISDN/D channel 126 is preserved across system 10 and reconstituted at the opposite end because of the LAPD-LAPM-LAPM-LAPD transition. Therefore LAPD error detection and correction will be ignorant of the satellite as a physical connection and the use of LAPM to suit that physical connection.

Figure 4:
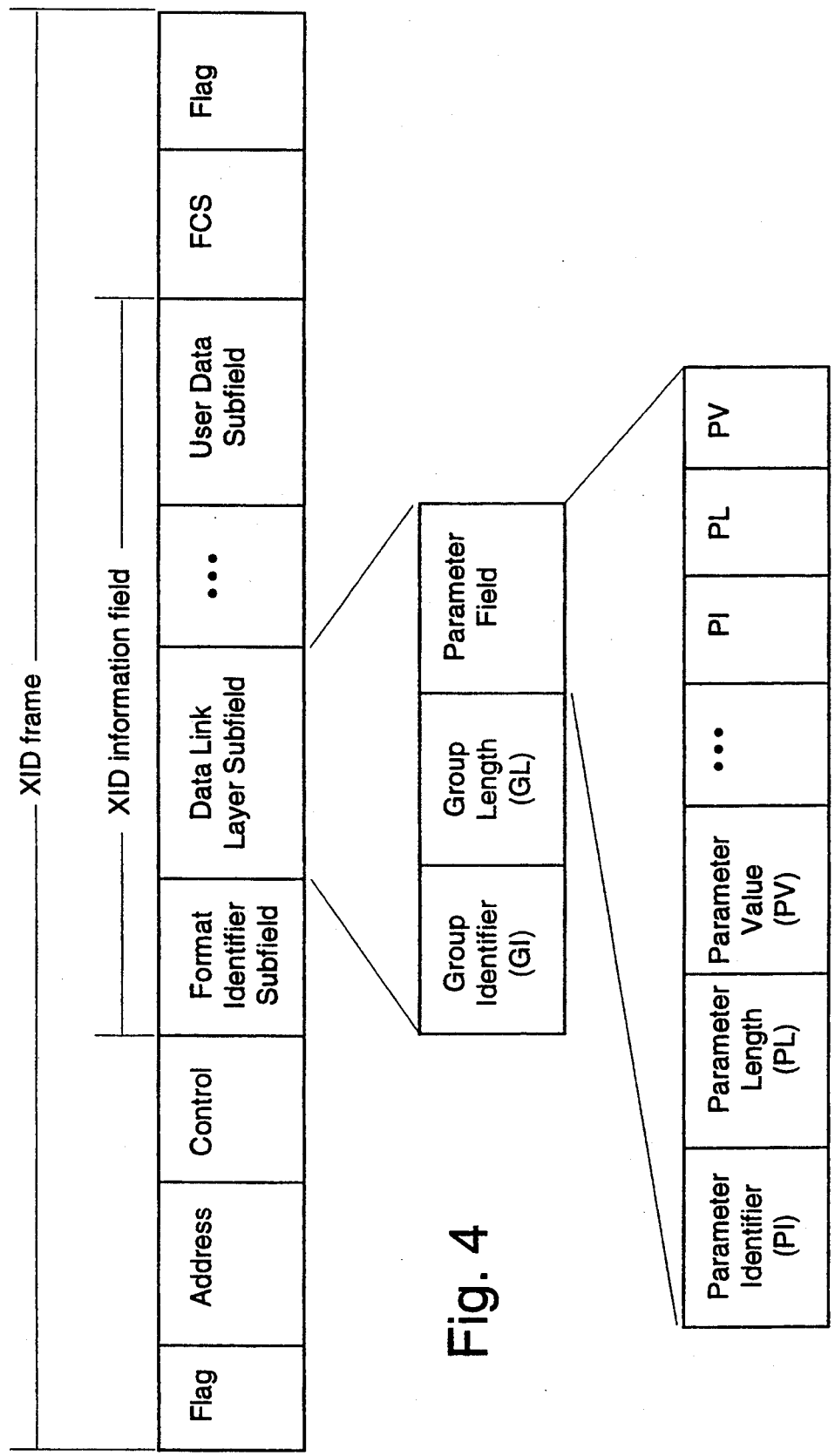
FIG. 4 is a diagram of a typical LAPM frame such as in FIG. 3.

FIG. 4 illustrates a LAPM frame, such as carried by D-channel 160 in FIG. 3. LAPM is described under Recommendation V.42 in the CCITT "Blue Book" as "Error-Correcting Procedures for DCES Using Asynchronous-to-Synchronous Conversion". The principal features of standard LAPM include interworking in a non-error-correcting mode with asynchronous to synchronous conversion according to Recommendation V.14; error detection using a CRC; error correction via automatic re-transmission of data; synchronous transmission through the conversion of start-stop data; and an initial handshake in start-stop format. The use of LAPM in the present embodiments does not necessarily involve the use of DCEs, therefore the DCE-dependent features and options included in LAPM are relatively unimportant. However, the selective reject feature in LAPM is important and is used to keep error-handling data traffic over the satellite link within manageable levels. The standard LAPM command and response frames are listed in Table I.

TABLE I

| FORMAT | COMMANDS | RESPONSES |
| --- | --- | --- |
| Information Transfer | I (info) | |
| Super-visory | RR (receive ready) | RR (receive ready) |
| | RNR (receive not ready) | RNR (receive not ready) |
| | REJ (reject) | REJ (reject) |
| | SREJ (selective reject) | SREJ (selective reject) |
| | SABME (set async balanced mode extended) | |
| | | DM (disconnected mode) |
| Un-numbered | UI (unnumbered info) | UI (unnumbered info) |
| | DISC (disconnect) | |
| | | UA (unnumbered acknowledgments) |
| | | FRMR (frame reject) |
| | XID (exchange ID) | XID (exchange ID) |
| | TEST (test) | |

Within LAPM, exchange identification (XID) frames, as illustrated in FIG. 4, are used to exchange general identification information. No sequence numbers are contained within the control field of an XID frame. The P/F bit is set to zero. The information field of XID frames is used for negotiation and indication of parameter values and optional procedures. The encoding of the information field is shown in FIG. 4. The information field comprises a number of sub-fields, including a format identifier sub-field, a zero or more data link layer sub-field and sometimes a user data sub-field.

The layer three signaling protocol comprises two variants of the messages and procedures for circuit-switched call control. These variants are termed functional and stimulus signaling protocols respectively, and in general the particular variant to be used is negotiated at the start of the call set-up procedure.

Functional signaling is the layer three variant best suited to intelligent devices such as intelligent terminals, PBXs, etc. Functional signaling messages have an unambiguously defined meaning known to both the sender and receiver of the messages.

Stimulus signaling was designed to accommodate inexpensive dumb terminals. It essentially allows communication between the human user of the dumb terminal and the ISDN exchange, with the dumb terminal acting as a more or less transparent intermediary. In particular, functional signaling requires that both ends (e.g., the terminal or PBX and the ISDN exchange) keep track of call state information, whereas, in the case of stimulus signaling, only the ISDN exchange keeps track.

Both the stimulus and functional signaling protocols have been aligned to the extent that the message sequences for set-up and clear-down of a simple circuit switched call are essentially the same.

The layer three signaling protocol used on the ISDN/D channel is based on a set of signaling messages needed to set up and tear down a simple 64K bps circuit-switched voice or data connection.

With regard to PABX 30 (FIG. 1), an ISDN/BRI interface 32 is handled like an ISDN/PRI case, except that only two ISDN/B channels and an ISDN/D channel are physically and logically grouped. The interface is a four-wire RJ-45 link. An analog interface for normal analog voice on PABX 30 uses an analog line unit (ALU) for 64K bps encoding. For encrypted inputs, e.g., digitized and modulated voice on an analog channel, the input is demodulated to regenerate the bit stream, the bit stream is sent back into PABX 30, together with control information, to indicate that the input is encrypted voice. If the analog channel carries data, for example, the output from a modem, the input is demodulated and padded and sent into PABX 30, using a modem and a data communication adapter (DCA). The interface preferably supports asynchronous serial communication up to 19,200 bps, using twisted pair from dedicated DCA and supports modem pooling giving 300, 1200 and 2400, 4800, 9600 and 19,200 baud (Bell 103,212A, and CCITT V.22bis). This is done by pairing a modem in a pool with a DCA connected to PABX 30. The modem attaches to PABX 30 through an analog line circuit and the DCA attached to PABX 30 through a digital line circuit. This pair performs protocol conversion between digital multiplex interfaces (DMI) protocol (digital) that is used to handle data inside PABX 30 and the analog (tone) protocol that is used by the modems. (DMI provides T1 transmission between two devices and supplies 23 user channels; Control is via ISDN common channel signaling.) PABX modem polling permits a modem to be dialed up from a DCA or from an ISDN/BRI asynchronous DCA emulator. A modem interface allows a user to access external service providers such as MCI Mail or Dow Jones over standard analog lines. FAX messages are handled in a special fashion, and are stored and forwarded. PABX 30 preferably support three additional formats, RS-232 port, DMI trunk and a X.25 packed assembly/disassembly (PAD).

The RS-232 port is supported like a modem port, except that no actual modulation/demodulation takes place. Like a modem port, it is an asynchronous port. To communicate with this type of port, PABX 30 converts the synchronous data stream to an asynchronous data stream and vice versa, using a DCA. As in the modem case, this step includes performing the necessary bit padding/unpadding to rate adapt the RS-232 port to the 64K bps DMI (e.g., ISDN type) protocol and the rate used within PABX 30.

The DMI trunk is a point-to-point (e.g., to another PABX) interface with a set of 64K bps clear channels. In effect, this means that the raw 64K bps ISDN/B channel format is transmitted to another PABX. The format is similar to an ISDN, but is defined such that it is only guaranteed to work when connected at the other end to another PABX of the same manufacture. This is useful for creating a system of PABXs that appear to the user as a single one, although they may not be at the same location. The DMI has twenty-three ISDN/B and ISDN/D channels, or thirty ISDN/B and one ISDN/D channels, e.g., compatible with North American T1 and CCITT Conference of European Posts and Telecommunications (CEPT) links.

Referring once more to FIG. 1, the satcom modem satellite link 52 provides connectivity between satcom modem 34 communication/request channels and PST 12. It consists of two types of data communications channels, communication and request, which are both satellite links. There is also a timing channel, which does not carry communications. Link 52 comprises digital signal processors, various radio frequency (RF) equipment, several levels of modulators, an up-converter, a power amplifier, a satellite with additional amplifiers and converters, a downconverter, multi-level demodulators, and a 0.25 second delay line consisting of empty space.

Each communication channel bank 38 carries user data from NCU 20 to a PST 12, and each provides about 25K bps raw capacity. Depending on atmospheric conditions or deliberate choices, it can be as low as about 3K bps (the raw rate divided by 2, 4 or 8). This raw rate will support a 2400 bps LPC-10E or 4800 bps CELP encoded voice channel and a 2400 bps to 19,200 bps data channel (the combined voice and data rates preferably do not exceed 19,200 bps). It also supports a 320 bps to 2560 bps facility channel. Through a facility channel, a PST 12 user is able to setup and teardown the base-satellite link that carries ISDN voice and data and convey system 10 proprietary NMS 49 messages.

The satcom modem 34 request channel 40 includes a single call request/reservation channel through which satcom modem 34 is able to receive call origination request messages from all PSTs 12. With this channel, satcom modem 34 can deliver outbound call messages to any PST 12. These two messages initiate the incoming and outgoing calls. The request channel is able to transmit system 10 proprietary bulletin messages to all PSTs 12 in the field operating in a standby mode (e.g., listen only) as a true broadcast, or as a multicast, such as a group broadcast to predefined groups of PSTs 12.

The satcom modem-PABX link 56 is an ISDN/BRI-type link between individual satcom modems 34 and PABX 30. Link 56 supports basic rate interface by carrying two ISDN/B channels plus an ISDN/D channel. The ISDN/D channel carries normal ISDN call signaling information. Satcom modem 34 behaves as a so-called "TA" and PABX 30 behaves as a "NT" device. Link 56 is similar to the TIU-RTU link 50.

For an analog interface, certain information appears in PABX-satcom modem data link 56. If the external representation is of a normal analog voice, the input signal is digitally encoded to 64K bps and sent to satcom modem 34 over a voice ISDN/B channel as a 64K bps voice stream. If the external source is encrypted voice (e.g., digitized and modulated), the input signal is sent as an encrypted bit stream padded to 64K bps to the satcom modem 34. The voice ISDN/B channel to the satcom modem 34 is used, together with control information to indicate that this is encrypted voice. If the analog channel carries data, e.g., the output from a modem, it is demodulated and presented on the DATA ISDN/B channel to the satcom modem 34, padded as necessary. Physically, these links, one per satcom modem 34, are ISDN four-wire RJ-45 cables.

The satcom modem communication highway 58 is an internal management link. While necessary for the functioning of system 10, it does not typically carry any user data. The satcom modem communication highway 58 provides connectivity between request channels 40 and satcom modem controllers 46. A point to multi-point structure enables satcom modem controller 46 to communicate with all the modem channels simultaneously using broadcast messages or individual communication channels using a channel by channel addressing scheme.

The NMS-NCU link 60 is like satcom modem communication highway 58, and is an internal link that does not carry user data. NMS-NCU link 60 carries a TCP/IP based network which provides access to one or more satcom modem controller 46 preferably from a centralized maintenance site where NMS 49 may be located. Through NMS-NCU link 60, NMS 49 is able to address individual system 10 network components remotely and economically. Both NMS 49 and satcom modem controller 46 may be connected to NMS-NCU link 60 via an Ethernet based communication server that provides IP routing over fixed leased line or dialup lines and works transparently on the TCP/IP network. The communication server preferably has a modular architecture to allow it to change and adapt to a growing need.

The communication server is capable of network routing over a wide area network by using the pubic switched telephone network dynamically and/or via permanent leased lines. It automatically establishes dial-up and leased line connections, whenever IP packets destined for the NMS 49 or satcom modem controller 46 arrive at network equipment from a remote location. In order to provide remote dial-up access to the NMS 49 to facilitate remote system administration, the communication server supports serial line protocols, such as SLIP and PPP.

In operation, the satellite communication link between NCU 20 and one of the PST 12 users is used to carry one or more communication channels depending upon the mode of operation. From the user's point of view, there are four modes of PST operation: namely, DORMANT, STANDBY, ACTIVE and BUSY mode. In DORMANT mode, TIU 16 is disconnected from a voice and data integration board (VDIB) or powered-off.

In STANDBY mode, TIU 16 is connected to the VDIB and operates in a uni-directional (e.g., LISTEN ONLY) condition. STANDBY is a low power consumption mode. Under this mode of operation, RTU 14 shuts off its transmitter, while PST 12 is tuned to the request channel and listens to both LCPR broadcast messages and incoming call messages. At TIU 16, a PST 12 user is able to receive a broadcast message transmitted by the request channel at NCU 20. The user will also be able to receive the incoming call information (e.g., Calling ID) when it is available to perform call screening. It is not necessary for any TIU 16 control program to be activated in this mode, as TIU 16 is expected to be able to generate both audio and video indications to a user while TIU 16 is running other application.

In ACTIVE mode, TIU 16 has a control program that is activated and currently engaged in a bi-directional voice or data communication session through a designated communication channel. In BUSY mode, the control program is activated and currently engaged in a bi-directional voice and data communication session through the designate ISDN/D channels.

An incoming call to the modem channel bank 36 from the network side is routed to a call HUNT group within PABX 30 and will scan the modem channel ISDN/BRI for an STANDBY condition. Under the control of a call hunting feature, PABX 30 will locate a first STANDBY ISDN/BRI and send the incoming call to that port. If all the modem channels are busy (e.g., ALL TRUNK BUSY), PABX 30 will process according the HUNT group configuration. When a HUNT group is administrated with an overflow destination any calls which arrive after ALL TRUNK BUSY CONDITION is re-routed to the overflow destination. Otherwise the incoming call is queued internal to PABX 30 in a FIFO order. Through the ISDN/BRI the modem channel is able to extract the essential call information through the ISDN CALL CONTROL and Q.931 messages and send the processed call information to satcom modem controller 46 via the point to multi-point bus. Using this call information satcom modem controller 46 will fetch the corresponding PST data file from the data base and initiate the appropriate action accordingly. The following demonstrates the significance of PST 12 mode of operation in relation to an inbound call process.

For DORMANT, satcom modem controller 46 broadcasts an incoming call alert message through request channel 40 via the point to multi-point bus to solicit a response from the corresponding PST 12. The satcom modem controller 46 will time-out after a predetermined period and store an incoming call event into the corresponding-data base, and then re-route the call to an alternative answering system (e.g., voice mail for voice call and E-mail system for a data call). The incoming call event message is delivered to one of the PST 12 displays as soon as the particular PST 12 has been identified as ACTIVE.

For STANDBY, satcom modem controller 46 broadcasts an incoming call alert message through request channel 40 via the point to multi-point bus to solicit a response from the corresponding PST. When PST 12 receives the message TIU 16 control program will generate audio and visual message to it's display. If the user decides to accept the call TIU 16 control program will then generate a response to the incoming call alert message and transmit a call accept message via the designated STANDBY modem channel, e.g., the modem channel where the call is currently being placed by PABX 30. Otherwise, satcom modem 34 will time-out and follow PST 12 DORMANT handling procedure.

For ACTIVE, currently simultaneous voice and data inbound calls are not supported until later in the day. The satcom modem controller 46 sends an appropriate incoming call message to PST 12 display via the Facility Data channel and re-routes the incoming call to an appropriate alternative answering system.

For BUSY, satcom modem controller 46 sends an appropriate incoming call message to PST 12 display via the Facility Data channel and re-routes the incoming call to an appropriate alternative answering system.

An outgoing call from PST 12 to the network side is initiated by PST 12 user at TIU 16. Under the control of TIU 16, control program PST 12 sends an outgoing call alert message to the request channel or facility data channel according to the particular PST 12 mode of operation. The request channel is an "Aloha"-like contention channel common to all PSTs 12 in STANDBY mode. Therefore a contention algorithm is preferably embedded in the outbound call protocol. The outgoing call alert message is delivered to satcom modem controller 46 via the point to multi-point bus under the control of the request/traffic channel 40. There may be times that multiple calls are accumulated at satcom modem controller 46, so it is therefore necessary for satcom modem controller 46 to process these calls in a first-in first-out (FIFO) manner. However, if a priority option has been activated, satcom modem controller 46 may then process a call in a prioritized FIFO manner according to the user's priority level assignment.

For STANDBY mode, a PST 12 sends an outbound call alert message to the request channel. The request channel processes and relays the outbound call message to satcom modem controller 46 through the point to multi-point bus. The satcom modem controller 46 will then locate an STANDBY traffic and commands request channel 40 to send this information to the requesting PST 12.

For ACTIVE mode, one of the PSTs 12 sends an outbound call alert message to the traffic channel through a facility data channel within satcom modem 34. The traffic channel processes and relays the outbound call message to satcom modem controller 46 through the point to multi-point bus. The satcom modem controller 46 then locates an STANDBY traffic channel and commands traffic channel to send this information to the requesting PST 12.

Although the present invention has been described in terms of the presently preferred embodiments, it is to be understood that the disclosure is not to be interpreted as limiting. Various further alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A satellite communications link for transparent, end-to-end transportation between a network and a client of error-free data exchanges having link access protocols otherwise incompatible with signal delay and noise inherent in satellite communication channels, the link comprising:

a first interface for connecting to a network channel that is supported by a first data link protocol that detects and corrects end-to-end transmission errors that may be introduced during a signal transmission of a first numbered sequence of first data packets over an access connection;

network-to-satellite protocol conversion means connected to the first network interface and a first satellite communications channel for encapsulating whole frames of said first numbered sequence of first data packets and their respective sequence numbers as data information only into a plurality of data fields respectively included in a second numbered sequence of second data packets for satellite transmission with a second data protocol which includes means for selectively rejecting and retransmitting single ones of said second data packets;

satellite-to-client protocol conversion means connected to a second satellite communications channel capable of exchanging data with said first satellite communications channel via an orbiting satellite for unencapsulating said first numbered sequence of first data packets and their respective sequence numbers from said data fields of said second numbered sequence of second data packets; and a second interface connected to the satellite-to-network protocol conversion means and to a client channel that is supported by said first data link protocol and providing for an end-to-end communication between said client and said network for transparent communications channel support according to said first data link protocol, notwithstanding said intermediate conversion to and from said second data link protocol.

2. The link of claim 1, wherein:
the first and second interfaces include basic rate interface means for transporting a signaling channel equivalent to said client channel and said network channel and a pair of data channels for data communication among multiple users in cooperation with said signaling channel.

3. The link of claim 1, wherein:
said first data link protocol includes means for detecting any errors or drop-outs end-to-end, and means for said first data link layer to communicate with a peer at an opposite end of a current access connection to request a re-transmission of first data packet messages for an error-free, in-sequence transmission of messages.

4. The link of claim 1, wherein:
said second data link protocol includes means for detecting any errors or drop-outs between the network-to-satellite and satellite-to-client protocol conversion means and means for said second data link layer to request a retransmission across the satellite communication means of particular second sequence numbered second data packet messages for an error-free, in-sequence transmission of messages that is independent of any error-correcting procedures of said second data link protocol.

5. The system of claim 1, further comprising:
rate adaptation means connected to first interface for compressing said client and network channels from 16K bits per second to approximately 2.4K bits per second wherein satellite bandwidth is economized.

6. The system of claim 1, wherein:
the satellite communication means includes an adjustable-power-output transmitter for transmitting said second data link protocol on a microwave radio frequency (MRF) carrier.

7. The system of claim 6, wherein:
the satellite communication means further comprises dynamic adjustment means to vary said MRF carrier to maintain a minimum power level that maintains a predetermined level of signal-to-noise ratio (SNR) in said MRF carrier.

8. A communications system for extending International Telegraph and Telephone Consultive Committee, CCITT, integrated services digital network, ISDN, connectivity over a communications satellite link, the system comprising:

first conversion means codected between a first ISDN basic rate interface, ISDN/BRI, and a first satellite communications interface for translating a link access procedure-ISDN/D-channel, ISDN-/LAPD, protocol at said first ISDN/BRI to and from a CCITT Recommendation V.42-link access procedure-modem, V.42/LAPM, protocol at said first satellite communications interface;

second conversion means connected between a second ISDN basic rate interface, ISDN/BRI, and a second satellite communications interface for translating a V.42/LAPM protocol at a satellite communications interface to and from an ISDN-/LAPD protocol at an ISDN/BRI interface; and satellite communication means connected between said first and second satellite communication interfaces for carrying said V.42/LAPM protocol transparently between the first and second conversion means and for establishing an ISDN-to-ISDN connection of said ISDN/LAPD end-to-end across the system in the presence of noise and delays associated with such satellite communication.

9. The system of claim 8, wherein:
the first and second conversion means each comprise packing and unpacking means for inserting and extracting a whole LAPD frame into and out of an information field of a LAPM frame for employing selective reject operation to limit a number of retransmitted frames necessary for error correction coupled via the satellite communication means.

10. A communications system, comprising:
protocol conversion means connected between a first and a second communications port and for translating an integrated service digital network basic rate interface, ISDN/BRI, signal at said first communications port to and from a link access protocol/modem, LAPM CCITT Recommendation Q.921/Q.931 signal at said communications second port; and satellite communication means connected to said second communications port for coupling said LAPM CCITT Recommendation Q.921/Q.931 signal between said second port and a second port of a second one of said communications system via a communications satellite for ISDN-to-ISDN communication.

11. The system of claim 10, further comprising:
rate adaptation means connected to said first communications port for compressing a channel within said ISDN/BRI from approximately 16K bits per second to approximately 2.4K bits per second, wherein satellite bandwidth is economized.

12. The system of claim 10, further comprising:
an adjustable-power-output transmitter connected to said second communications port for transmitting said LAPM signal on a microwave radio frequency (MRF) carrier between said communications satellite and the satellite communication means.

13. The system of claim 12, wherein:
the satellite communication means further comprises dynamic adjustment means connected to the transmitter providing for said MRF carrier to maintain a minimum power level that maintains a predetermined level of signal-to-noise ratio (SNR) in said carrier between said communications satellite and the satellite communication means.

14. A communications system, comprising:

first protocol conversion means connected between a first and a second communications port and for interfacing a first International Telegraph and Telephone Consultive Committee (CCITT) integrated service digital network basic rate interface, ISDN/BRI, signal at first communications port to and from a first CCITT Recommendation V.42-link access procedure-modem, V.42/LAPM, CCITT Recommendation Q.921/Q.931 signal at a second port; and first satellite communication means connected to said second communications port and for coupling said first LAPM-type CCITT Recommendation Q.921/Q.931 signal at said second communications port to a communications satellite in earth orbit;

second protocol conversion means connected between a third and a fourth communications port and for translating a second ISDN/BRI signal at said third communications port with a second LAPM CCITT Recommendation Q.921/Q.931 signal at said fourth port; and second satellite communication means connected to said third communications port for coupling said second LAPM-type CCITT Recommendation Q.921/Q.931 signal at said fourth port to said communications satellite for establishing ISDN-to-ISDN communication via said communications satellite.

* * * * *